Sept. 13, 1932.  G. M. CROSS  1,876,863
SHOCK ABSORBER
Filed June 6, 1928  2 Sheets-Sheet 2
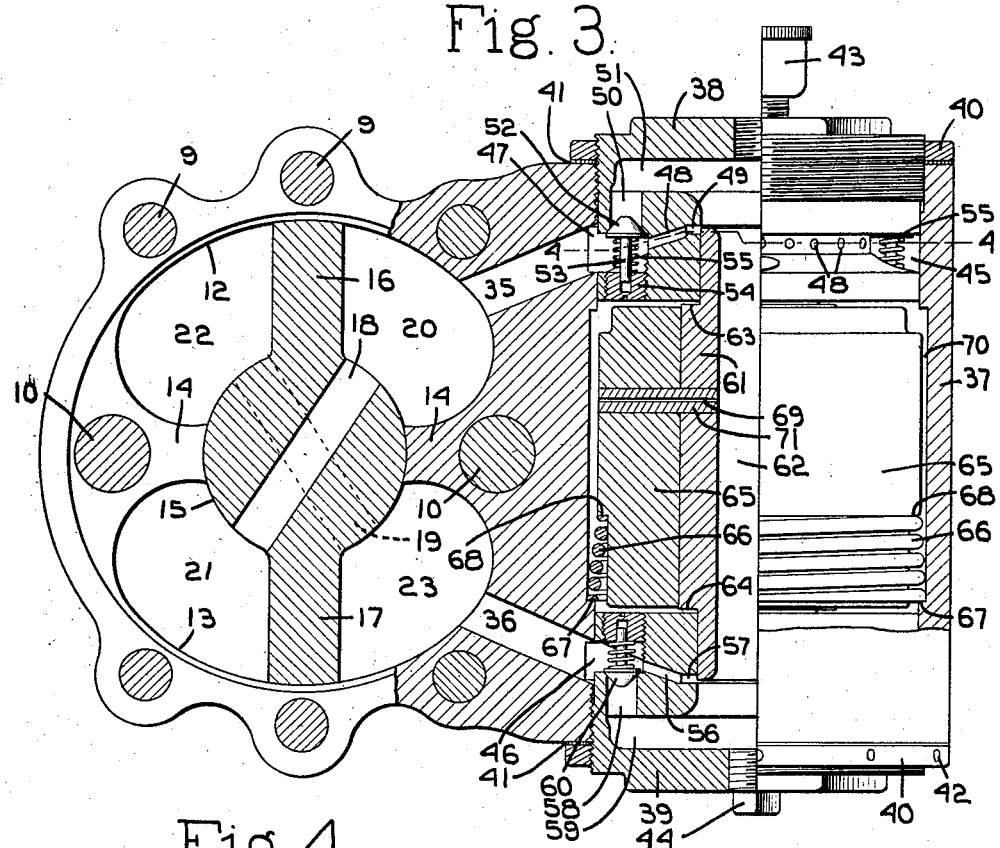
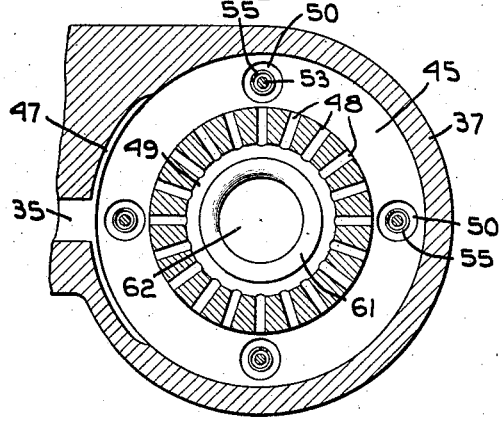
Inventor.
Grosvenor M. Cross
by Heard Smith & Tennant.
Attys.

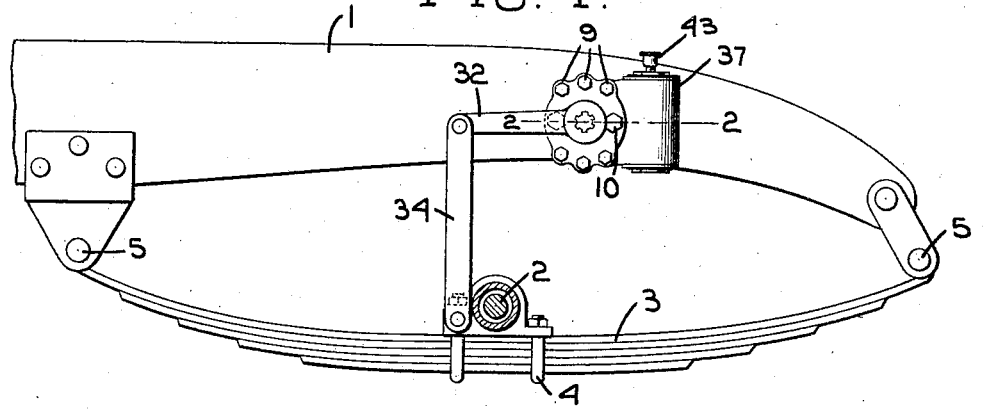
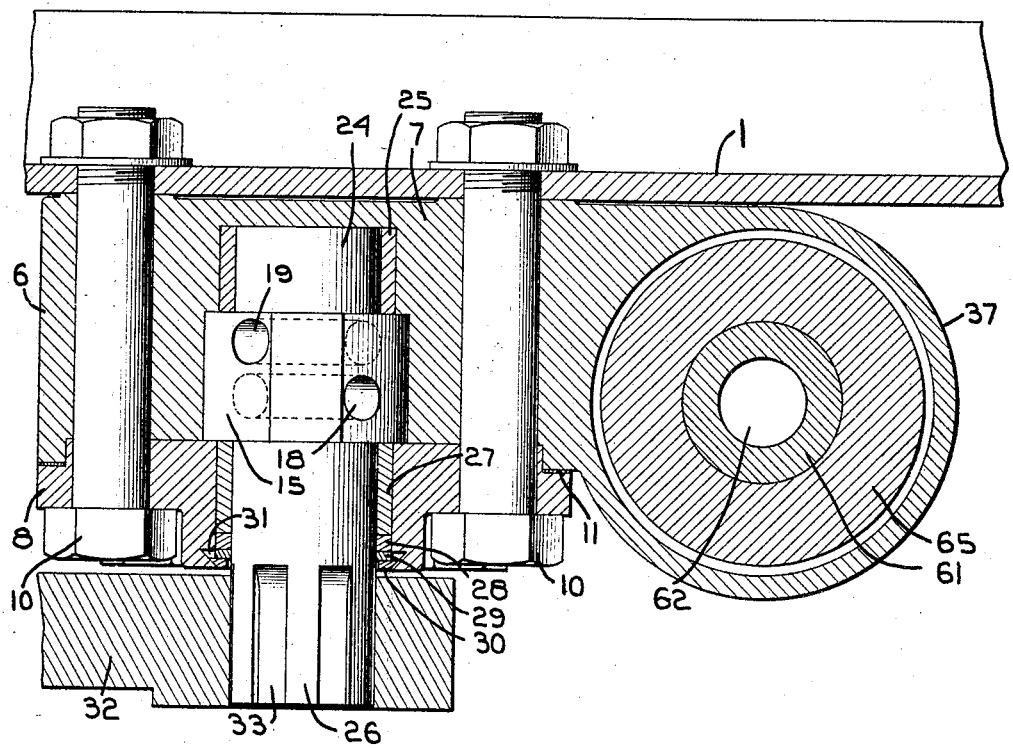

Patented Sept. 13, 1932

1,876,863

UNITED STATES PATENT OFFICE

GROSVENOR M. CROSS, OF BOSTON, MASSACHUSETTS

SHOCK ABSORBER

Application filed June 6, 1928. Serial No. 283,354.

This invention relates to a means and to a method for controlling the movement between two bodies which are moved relatively toward and from each other in order to eliminate, neutralize or overcome undesirable forms of such movement. The invention involves certain broad principles and is therefore applicable to a wide range of uses and may be embodied in various types of mechanism. One type of mechanism in which the invention is preferably embodied and by means of which the invention may be practiced is a vehicle having a body supported by a spring or other suitable yielding means from the axle or other part of the running gear. Such a type of mechanism is exemplified in the ordinary automobile. There are here present two bodies, namely, the vehicle body and the axle, which are movable relatively toward and from each other by the action and reaction of the interposed spring according to the load and the changing conditions of vehicle speed and road surface. A disclosure of the invention as applied to the control of the relative movement between the vehicle body and the axle of such an automobile will serve to illustrate not only a specific adaptation of the invention, but also the broad principles involved therein.

In this invention when one of the two bodies thus movable relatively toward and from each other has an absolute movement in either direction without accelerated velocity, the normal desired conditions exist. When the velocity of movement of the said body has been accelerated, an undesired or abnormal condition exists and a mechanism embodying the present invention becomes active to prevent unnecessary acceleration and to ensure its movement taking place at a constant or decelerated velocity. The invention thus has its controlling effect upon the relative movement between the two bodies whenever a change in velocity of movement of the one body relative to the earth or given base takes place.

The principle involved is that so long as movement is taking place at a constant velocity, there can be no experience of shock to anything carried by either or both of the two bodies, but whenever a change in the velocity of movement takes place, shock varying in intensity with the degree of change will be experienced. This invention neutralizes or substantially eliminates any unnecessary experience resulting from change in velocity and is therefore herein referred to as a shock absorber for want of a better term.

Considering now the specific adaptation of the invention to a vehicle having a spring-supported body, it will be observed that the spring is always in one of three conditions, that is, either at its normal pressure just sufficient to sustain the weight of the body with its load or at greater than normal pressure, as, for example, when a rise in the road raises the axle faster than the body rises, due to its inertia, or at less than normal pressure, as, for example, when a drop in the road lowers the axle faster than the body drops, due to its inertia.

The travel, that is, the range of movement between extreme compression and extreme expansion of a vehicle spring, is necessarily limited and it is thus necessary for the vehicle body to move vertically to some extent with each change in road level and also to do this very rapidly when required. But in order to reduce shock to a minimum, each change in velocity of vertical movement in either direction must be reduced to a minimum and this is accomplished by the present invention.

Consider now an automobile running on a roadway. When the wheel strikes an elevation, either a sudden obstruction or an up-grade, it rises beneath the body, but as the inertia of the body keeps it from rising immediately, the spring is compressed. Thus the spring pressure is increased, causing the spring to move the body upward with an accelerated velocity of vertical movement until the normal pressure of the spring is reached. Then inertia moves the body still further vertically, expanding the spring and thus diminishing the pressure of the spring. The action is reversed and repeated with diminishing force producing the familiar series of "rolls".

The change in spring pressure which takes place as the wheel rises beneath the body is necessary in order that the body may follow the general surface of the road and springs are so designed as to keep the axle from striking the vehicle body under ordinary conditions. Such change in spring pressure is therefore necessary and desirable. Any acceleration of the body either upward or downward under the action of the spring beyond the point where the corresponding compression or expansion of the spring has ceased is undesirable and unnecessary and results in an unnecessary shock.

With the present invention applied under the conditions just stated, when the wheel strikes an elevation in the road, the axle moves freely upward beneath the vehicle body. But when the point is reached where the vehicle body and axle have an opposite relative movement, that is, tend to separate or, in other words, when the change in spring pressure has done its work, then the relative movement between the axle and vehicle body is controlled so that as long as the body continues to rise at the same velocity with which it has begun to rise, it will be allowed so to rise. But any tendency to rise faster, that is, any acceleration in the velocity of movement acts to prevent such change in velocity and restore the movement to that of the said constant velocity. Thus while during the short period of the compression of the spring, which is essentially necessary, there is some shock, further shock is prevented because when the spring begins to expand, the rise of the body takes place without accelerated velocity until the normal position of the body above the axle is reached. If the spring does not move freely by reason of inherent friction or other retarding cause, there may be movement of the body with decelerated velocity, but in no event can the body move with accelerated velocity under these conditions. A broad feature of the invention therefore consists in preventing acceleration in velocity of the body in either an upward or downward direction after the maximum compression or expansion of the spring is attained, which acceleration in either case would be the main cause of shock.

The conditions prevailing with this invention when the vehicle wheel strikes an elevation in the roadway are reversed, but are exactly similar, when the wheel strikes a depression, due either to a down-grade or a sudden drop in the road surface. In this case the spring first expands faster than the inertia of the body permits the body to move. Normally the velocity of the downward movement of the body continuously increases due to the decrease in the normal pressure of the spring until the spring is again compressed to its normal extent when the inertia of the body carries it below this point. With the present invention the axle is allowed to drop freely during the initial expansion of the spring, but as soon as the relative movement is reversed and the axle and body tend to move toward each other, the invention acts to hold the axle and body apart but allows the body to continue its downward movement at a constant velocity. Any tendency toward acceleration in velocity again acts to restore the movement to that of constant velocity and the body again resumes its normal distance from the axle.

The construction in which the invention is embodied must therefore be capable of exercising sufficient force between the two relatively movable bodies, such as the vehicle body and axle, both to hold them apart and to hold them together entirely independently of the forces, such as the forces of the springs and the force of inertia which act to effect the relative movement.

In its preferred form the invention is embodied in a fluid operated device comprising a valve balanced by a weight, spring or other means and the inertia of which controls the fluid flow. Thus the forces produced by the invention to neutralize or overcome the shock or change in the relative movement between the two bodies tending to accelerated velocity of the one body are controlled directly by its change in velocity. In other words, the undesired movement is itself utilized by this invention to prevent such movement.

The drawings illustrate a simple and preferred form of the invention as applied to an ordinary type of automobile for controlling the movement between the vehicle body and axle. In this specific illustration, the invention is also embodied in a fluid operated mechanism comprising two main elements, one connected to the vehicle body and the other to the axle, one of these elements being shown as a rotary oscillating piston and the other as a chambered casing in which the piston oscillates. But it is to be understood that these and the other features illustrated are, so far as the broader principles of the invention are concerned, but exemplifications of the broad principles of the invention.

In the drawings:

Fig. 1 is a side elevation of a portion of an automobile body frame, axle and spring with a preferred form of the invention connected thereto.

Fig. 2 is an enlarged detail chiefly in horizontal cross section taken on the line 2—2 of Fig. 1.

Fig. 3 is a view partially in elevation, partially broken away, and partially in central vertical cross section of the construction shown in Fig. 2.

Fig. 4 is a view in horizontal cross section taken on the line 4—4 of Fig. 3.

The two bodies having a relative movement toward and from each other are here indicated as the frame 1 of a vehicle body such as that of an automobile and the axle 2 carrying the wheels. A vehicle spring 3 of the usual type is shown as interposed between the body 1 and the axle 2, being clamped at 4 to the axle and pivotally connected at its ends 5 to the frame body 1 in the usual manner.

The device in which the invention is shown as embodied comprises two elements, one of which is connected to the axle and the other of which is connected to the vehicle body. The latter element is shown as a heavy, chambered casing indicated generally at 6 and comprising a body 7 and a cap 8. The cap 8 is secured to the face of the body 7 by set screws 9 and also by two bolts 10, which bolts pass entirely through the casing body and through the frame 1 and thus firmly secure the casing to the frame. A gasket 11 is placed between the body 7 and the cap 8. The body 7 is bored out from the face against which the cap 8 rests to present a recess having the cylindrical walls 12 and 13 with the radially inwardly projecting fins 14.

The other element of the device is shown as an oscillating rotary piston mounted in the recess in the body 7 and connected to the axle 2. This piston comprises a cylindrical hub 15 concentric with the bore of the casing body fitting against the inner ends of the fins 14 and having two radial blades 16 and 17 fitting at their ends respectively against the cylindrical surfaces 12 and 13. Bores 18 and 19 extend diametrically through the piston hub 15 so that the piston divides the recess in the casing body into two chambers, one chamber being the portions 20 and 21 of the recess and the connecting bore 18 and the other chamber being the portions 22 and 23 of the recess and the connecting bore 19.

The piston hub is shown as having a large journal 24 seated in a bushing 25 in the back of the casing body 7 and another journal 26 seated in a bushing 27 in the cap 8. A packing joint is formed at the outer face of the cap and is shown as comprising a packing cap 28 forced into engagement with the journal 26 and the bushing 27 by a washer 29 and a split expansion ring 30 bevelled at its periphery and snapped into place in an undercut bevelled groove 31 in the cap.

A suitable connection adapted to take both thrust and compression is effected between the rotary piston and the axle. For this purpose an arm 32 is splined and keyed at 33 to the end of the piston journal 26 and at its free end is pivotally connected to a link 34, in turn pivotally connected to the clamp 4 on the axle 2. Thus any relative movement which takes place between the axle and the vehicle body in either direction causes rotation of the piston in the casing in one direction or the other.

Two passages 35 and 36 communicate with the piston chambers, the passage 35 communicating with the chamber 20—18—21 and the passage 36 with the chamber 23—19—22. Suitable fluid such as oil fills the piston chambers and passages and consequently it will be seen that if the flow of this fluid through the passages 35 and 36 be under control, the rotary movement of the piston with respect to the casing will be under control, because the piston cannot rotate in either direction without fluid flow taking place through these passages. Consequently by controlling the flow through these passages, the relative movement between the vehicle body and axle in either direction is controlled.

This control of the fluid flow is effected in the preferred form of the invention illustrated by a member shown as a valve carried by one of the bodies, in this case the vehicle body or frame 1, and balanced to move with the body to which it is connected in the direction of the relative movement when the body moves at a constant velocity and to move with respect to this body upon any change in said velocity. In the specific case illustrated, the valve itself is shown as weighted and controlled by a spring and immersed in the fluid so as to be balanced, but this is only a specific application of the principle because it is not necessary in the broader application of the idea that the balanced member shall be the valve itself. In the specific construction illustrated, the valve is shown as the balanced member and balanced to move vertically with the body frame and with respect thereto when a change in velocity of movement takes place.

In the construction illustrated, the casing 6 which contains the piston chambers is provided with an integral extension 37 in which is formed a vertical and cylindrical valve chamber containing the valve and communicating with the passages 35 and 36. The upper and lower ends of the casing for the valve chamber are closed by caps 38 and 39, respectively, threaded in place and consequently adjustable. After these caps have been adjusted to the desired position, they are locked in place by locking rings 40 threaded on to the caps and clamping gaskets 41 against the ends of the valve casings. These locking rings are provided with holes 42 to receive a spanner. The caps are provided with threaded filling and discharge apertures, the upper of which may be provided with a cup 43 for containing a small over-supply of oil and the lower of which is normally closed by a threaded plug 44.

The inner ends of the caps 38 and 39 are provided with exterior annular grooves 45 and 46, respectively, and these grooves with the inner peripheral wall of the valve chamber thus form annular chambers. The passage 35 communicates with the annular chamber 45, free communication being assisted by a recess 47 formed in the casing in line with the annular chamber and at each side of the passage 35. In a similar manner the passage 36 communicates with the annular chamber 46.

Two sets of ports are provided connecting the valve chamber with the annular chamber 45 and thence by the passage 35 with the piston chamber 20—18—21. One set of ports comprises a series of drill holes 48 extending through the body of the cap 38 and connecting the annular chamber 45 with a small annular groove 49 in the interior periphery of the cap opening into the valve chamber. The other set of ports comprises a series of larger ports 50, herein shown as four in number, extending vertically through the body of the cap and connecting the annular chamber 45 with a large annular chamber or groove 51 openng from the interior periphery of the cap to the valve chamber. The ports 50 are each provided with check valves closed by fluid flow from the piston chamber through the passage 35 and opened by fluid flow through these ports toward this piston chamber. These check valves are shown as having conical heads 52 seating at the inner ends of the ports 50 and carried by stems 53 sliding in plugs 54 threaded into the inner end of the cap in line with the ports. Helical springs 55 surrounding the stems 53 act to maintain the check valves closed.

The lower cap 39 is constructed in precisely the same manner, having a similar set of open ports 56 extending between the annular groove 57 and the annular chamber 46 and a similar set of ports 58 extending between the large annular chamber or groove 59 and the annular chamber 46, and normally closed by the spring-pressed check valves 60.

In the construction illustrated, communication between the annular chambers 59 and 57, and consequently between the sets of ports 48 and 56, with the valve chamber is controlled by the balanced valve. This valve is shown as a vertical cylinder or sleeve 61 which thus presents a vertical passage 62 therethrough in constant communication with the opposite ends of the valve chamber. This sleeve valve 61 is fitted to slide at its ends against the interior peripheries of the inner portions of the caps 38 and 39. It is exteriorly shouldered at 63 and 64 opposite the inner ends of the caps 38 and 39. The construction is such that when the shoulder 63 engages the cap 38, the upper end of the valve 61 closes the annular chamber 49 and when the shoulder 64 engages the cap 39, the lower end of the valve closes the annular chamber 57. The extent to which the movement of the valve will open these chambers at their interior peripheries to communicate with the central valve chamber therefore depends upon the longitudinal adjustment of the caps 38 and 39 of the valve casing, which by the threaded connections illustrated may be made with great nicety.

The piston chambers, valve chamber and all the communicating ports and chambers are filled with a suitable fluid such as oil. The valve 61 is balanced in the fluid by means of a heavy annular weight 65 secured to the exterior periphery of the valve and by a helical spring 66 seated between an annular shoulder 67 on the interior of the valve casing and an annular shoulder 68 on the exterior of the weight. The total weight of the valve and weight 65 and the tension of the spring 66 are constructed and adjusted so that the valve when immersed in oil will stand in its mid-position, opening the annular chambers 49 and 57 to the same extent. One or more breather holes 69 extend between the central passage 62 and the annular space 70 between the weight 65 and the inner periphery of the valve casing. These breather holes are conveniently formed in tubes 71 which thus serve to secure together the valve 61 and the annular weight 65.

While communication between the ends of the valve chamber or the chambers in the caps 38 and 39 is shown as established by the central opening extending longitudinally through the valve 61, it is obvious that the establishment of such communication is not to be limited to this particular passage. It will be observed also that the central valve chamber formed by the chambers in the caps and the communicating passage therebetween is neutral in pressure so that the supply of oil may be maintained by a device such as the cup 43 connected to the upper end of the valve chamber and supplying oil by gravity.

The operation of the exemplification of the form of the invention illustrated and applied to an automobile, as illustrated, will now be apparent.

All the piston chambers, valve chambers and other chambers and passages are filled with oil or other suitable fluid. The valve 61 is balanced and the caps 38 and 39 adjusted so that the valve stands in its mid-position with both annular chambers 49 and 57 open to the same extent and in communication with the central valve chamber. The load is assumed to be such that the vehicle spring 3 connecting the axle 2 and the vehicle body frame 1 is under its normal tension and in this position the link 34 and the arm 32 extending from the piston are arranged to maintain the piston blades substantially vertical or in the mid-position shown in Fig. 3.

So long, then, as there is no change in the existing conditions, there is no relative movement between the axle and the vehicle body and they are held apart by the normal tension of the vehicle spring. When, however, an obstruction is met or a rise in the grade of the road, the axle rises, compressing the vehicle spring 3 and causing the piston to rotate clockwise. This causes a substantially free flow of the oil compressed by the piston blade 16 in the piston chamber 20—18—21 through the passages 35 and the open ports and annular chamber 49 down through the valve chamber, back through the open annular chamber 57 and ports 56 and also through the ports 58 past the check valve 60, through the passages 36 into the piston chamber 23—19—22, thus allowing the axle to rise freely. But the compression on the spring 3 immediately tends to raise the vehicle body 1 and as the body moves upward, it carries the inner end of the cap 39 against the shoulder 64 of the valve 61, thus opening the chamber 49 to the limit allowed by the adjustment and the valve 61 and vehicle body move upward together at the same velocity, thus allowing the axle to continue to rise freely because the oil can be freely forced past the check valve 60. When the top of the rise or obstruction has been reached, or the body tends to move upwardly away from the axle, the direction of rotation of the piston is reversed, thus tending to reverse the flow of the fluid. But as the valve 61 is now in its lowermost position closing the annular chamber 57, and consequently the ports 56, and as the check valves 60 close the ports 58, such a reverse flow of the fluid cannot take place. The vehicle body and axle are therefor locked against separating movement with the vehicle spring partially compressed and an acceleration or increase in velocity of the upward movement of the body is prevented. This locking of the vehicle body and axle together immediately results in a decrease in the velocity of the upward movement of the body and immediately the valve 61, due to its inertia, moves upward with respect to the body, thus opening the ports 56 and allowing the flow of the fluid under the contra-clockwise movement of the piston to take place and thus allowing the upward movement of the vehicle body to take place. But if this upward movement of the body should tend to increase in velocity, then the valve 61 will again move downwardly with respect to the body, thus again closing the ports 56 and again retarding the upward movement of the body.

In actual practice, such a movement of the body, first too slow and then to fast, will not take place because the valve 61 will always open the ports 56 just sufficiently to allow the vehicle body to rise at a constant velocity, or at the same rate as the initial rise as given the valve 61 itself. Thus the construction illustrated will allow freedom of the initial flexing of the vehicle spring 3 and will allow the increased compression of the spring to take its proper first effect in raising the body and then to exert such a pressure that the continuation of the upward movement of the vehicle body will be at no greater than a constant velocity instead of at an accelerated velocity.

The action is precisely the same, but the reverse, in the case where the axle meets a reverse, in the down-grade or a sudden depression in the road, except that in this case when the valve 61 closes the ports 48 the vehicle body and axle are held apart. But as before, the vertical movement of the body will be at a constant or decelerated velocity, the valve 61 only opening the ports 48 sufficiently to allow the vehicle body to move downwardly at such a velocity.

The relative vertical movement which takes place between the vehicle body and the balanced weight or, when the balanced weight and valve are integral, as in the form illustrated, between the vehicle body and the balanced valve, may be referred either to the body or to the weight. Thus the balanced weight or the balanced valve may be considered as normally stationary in position with the body fluctuating or moving with respect thereto and thus the fluctuations in movement of the body acting to open and close the valve ports and effect the desired control in accordance with the principles of the invention.

Having thus described the invention, what is claimed as new, and desired to be secured by Letters Patent, is:

1. In a fluid-operated shock absorber connecting the axle and body of a vehicle, a valve balanced to move with the body whenever the body moves vertically at a constant velocity and to move with respect to the body in either direction only as a result of inertia due to a change in such velocity and means controlled by the valve acting to prevent separation and permit convergence of the axle and body when the valve is in one extreme position and to prevent convergence and permit separation of the axle and body when the valve is in its other extreme position and to check said separating or converging movements when the valve is between said positions.

2. In a fluid-operated shock absorber connecting the axle and body of a vehicle, a valve balanced to move vertically with the body whenever the body moves vertically at a constant velocity and to move with respect to the body in either direction only as a result of inertia due to a change in such velocity and means controlled by the valve acting to prevent separation and permit convergence of the axle and body when the valve is in lowermost position and to prevent convergence and permit separation of the axle and body when the valve is in its uppermost position and to check said separating movement when the valve is moving upward with respect to the body and to check said converging movement when moving downward with respect to the body.

3. In a fluid-operated shock absorber connecting the axle and body of the vehicle, a weight balanced to move vertically with the body whenever the body moves vertically at a constant velocity and to move with respect to the body upon a change in such velocity, a valve operated solely by the weight and means controlled by the valve acting to prevent separation and permit convergence of the axle and body when the weight is in its lowermost position and to prevent convergence and permit separation of the axle and body when the weight is in its uppermost position and to check said separating movement when the weight is moving upward with respect to the body and to check said converging movement when the weight is moving downward with respect to the body.

4. A shock absorber comprising a casing for fluid, a piston therein dividing the casing into two chambers and movable relatively thereto, means for connecting the casing and piston, one to the body and the other to the axle of a vehicle, a valve chamber in the casing having two sets of ports at each end, passages in the casing connecting the ports respectively to the piston chambers, a balanced valve in the valve chamber aranged when in its extreme positions to close one set of ports at one end and open the corresponding set at the other end of the valve chamber and in moving between extreme positions progressively to close and open said sets of ports, the said valve having a passage therethrough in constant communication with the opposite ends of the valve chamber, and check valves in the other sets of ports closed by fluid flow from the adjacent piston chamber and opened by fluid flow therethrough toward the adjacent piston chamber.

5. A shock absorber comprising a casing for fluid, a piston therein dividing the casing into two chambers and movable relatively thereto, means for connecting the casing and piston, one to the body and the other to the axle of a vehicle, a valve chamber in the casing having two sets of ports at each end, passages in the casing connecting the ports respectively to the piston chambers, a balanced valve in the valve chamber arranged when in its extreme positions to close one set of ports at one end and open the corresponding set at the other end of the valve chamber and in moving between extreme positions progressively to close and open said sets of ports, a free fluid passage connecting the ends of the valve chamber, and check valves in the other sets of ports closed by fluid flow from the adjacent piston chamber and opened by fluid therethrough toward the adjacent piston chamber.

6. A shock absorber comprising the construction defined in claim 4, in which the set of ports at each end of the valve chamber which is opened and closed by the valve is formed in a cap threaded into the casing whereby the maximum opening of said ports may be adjusted by adjusting the caps in the casing.

7. A shock absorber comprising the construction defined in claim 5, in which the set of ports at each end of the valve chamber which is opened and closed by the valve is formed in a cap longitudinally adjustable in the casing whereby the maximum opening of said ports may be adjusted by adjusting the caps in the casing.

8. A shock absorber comprising a casing for fluid, a piston therein dividing the casing into two chambers and movable relatively thereto, means for connecting the casing and piston one to the body and the other to the axle of a vehicle, a vertical cylindrical valve chamber in the casing, caps closing the ends of the valve chamber and each presenting an annular body projecting into and fitting the end of the valve chamber, and an inner and an outer annular chamber opening at the inner periphery of the body and an annular chamber in the exterior periphery of the body, passages in the casing between the respective piston chambers and the adjacent exterior peripheral annular cap body chamber, two sets of ports in each cap body extending from the exterior peripheral annular chamber, one set to the outer annular chamber and the other set to the inner annular chamber, check valves in the first set of ports closed by fluid flow from the adjacent piston chamber and opened by fluid flow therethrough toward the adjacent piston chamber, and a hollow cylindrical balanced valve in the valve chamber mounted to slide longitudinally therein and arranged when in its extreme positions to close the second set of ports in the one cap and open the second set of ports in the other cap and in moving between its extreme positions progressively to close and open said sets of ports.

9. A shock absorber comprising a casing for fluid, a piston therein dividing the casing into two chambers and movable relatively thereto, means for connecting the casing and piston one to the body and the other to the axle of a vehicle, a vertical cylindrical valve chamber in the casing, caps closing the ends of the valve chamber and each presenting an annular body projecting into and fitting the end of the valve chamber, and an inner and an outer annular chamber opening at the inner periphery of the body and an annular chamber in the exterior periphery of the body, passages in the casing between the respective piston chambers and the adjacent exterior peripheral annular cap body chamber, two sets of ports in each cap body extending from the exterior peripheral annular chamber, one set to the outer annular chamber and the other set to the inner annular chamber, check valves in the first set of ports closed by fluid flow from the adjacent piston chamber and opened by fluid flow therethrough toward the adjacent piston chamber, a free fluid passage connecting the ends of the valve chamber formed by the caps, and a balanced valve in the valve chamber mounted to slide longitudinally therein and arranged when in its extreme positions to close the second set of ports in the one cap and open the second set of ports in the other cap and in moving between its extreme positions progressively to close and open said sets of ports.

10. A shock absorber comprising the construction defined in claim 8, in which the caps and balanced valve are provided with cooperating shoulders limiting the longitudinal movement of the valve and in which the caps are longitudinally adjustable in the casing whereby the maximum opening of the ports opened and closed by the valve may be adjusted by adjusting the caps in the casing.

11. A shock absorber comprising the construction defined in claim 9, in which the caps and balanced valve are provided with cooperating shoulders limiting the longitudinal movement of the valve and in which the caps are longitudinally adjustable in the casing whereby the maximum opening of the ports opened and closed by the valve may be adjusted by adjusting the caps in the casing.

12. A shock absorber comprising the construction defined in claim 4, in which the said balanced valve moves vertically in the valve chamber and is balanced by means of an annular weight connected thereto and a spring interposed between the valve and the wall of the valve chamber to cause the valve normally to stand midway of its extreme positions.

13. A shock absorber having the construction defined in claim 8, in which the annular valve is balanced by means of an annular weight connected thereto and a spring interposed between the valve and the wall of the valve chamber to cause the valve normally to stand midway of its extreme positions.

14. The method of controlling the vertical movement of a vehicle body supported by yielding means from the axle which consists in controlling the relative movement between the body and axle to prevent accelerated velocity of the vertical movement of the body both during a rising movement of the body occurring simultaneously with an expanding movement of the yielding means and a falling movement of the body occurring simultaneously with a compressing movement of the yielding means and in permitting in each case a free movement of the body in the opposite direction.

15. The method of controlling the vertical movement of a vehicle body supported by yielding means which consists in permitting free deflection of the yielding means in either direction away from normal position and free movement of the body in response to said deflection until completion thereof and in causing any movement of the body, which takes place after completion of the said deflection of the yielding means, to take place without acceleration.

16. A shock absorber for a vehicle having a body and axle comprising a device connecting the body and axle and means carried by the body and movable only as the result of vertical acceleration of the body independently of the axle and acting when in one position to permit the body and axle to move together but to prevent them from moving apart and acting when in another position apart and to permit the body and axle to move apart but to prevent them from moving together.

17. A shock absorber for a vehicle having a body and axle comprising a device connecting the body and axle and means controlled solely by inertia and carried by the body and acting when in one position to permit the body and axle to move together but to prevent them from moving apart and acting when in another position to permit the body and axle to move apart but to prevent them from moving together.

18. A shock absorber comprising a casing for fluid, a piston therein dividing the casing into two chambers and movable relatively thereto, means for connecting the casing and piston one to the body and the other to the axle of a vehicle, a balanced valve and check valves controlling the flow of fluid between the two chambers, the said balanced valve being movable with respect to the casing solely by inertia and when displaced from mid position acting to restrict fluid flow between the chambers in one direction and permit such flow in the opposite direction and vice versa as determined by the direction of displacement.

19. The method of connecting the body and axle of a vehicle which consists in allowing free rising movement of the axle during an upward acceleration of the body and free falling movement of the axle during a downward acceleration of the body and in restricting the movement of the body during all other relative movements of the body and axle to movement at a constant velocity.

In testimony whereof, I have signed my name to this specification.

GROSVENOR M. CROSS.